United States Patent
Ullattil

(10) Patent No.: US 10,248,983 B1
(45) Date of Patent: Apr. 2, 2019

(54) CUSTOMIZED ITEM DESCRIPTIONS BASED ON SKILL LEVEL

(71) Applicant: Amazon Technologies, Inc., Seattle, WA (US)

(72) Inventor: Abi George Ullattil, Bothell, WA (US)

(73) Assignee: Amazon Technologies, Inc., Seattle, WA (US)

( * ) Notice: Subject to any disclaimer, the term of this patent is extended or adjusted under 35 U.S.C. 154(b) by 550 days.

(21) Appl. No.: 14/855,227

(22) Filed: Sep. 15, 2015

(51) Int. Cl.
- *G06Q 30/00* (2012.01)
- *G06Q 30/06* (2012.01)
- *G06F 17/30* (2006.01)

(52) U.S. Cl.
CPC ..... *G06Q 30/0623* (2013.01); *G06F 17/3053* (2013.01)

(58) Field of Classification Search
CPC ............ G06Q 30/0224; G06F 17/3053; G06F 17/30528
USPC ..................................................... 705/26, 27
See application file for complete search history.

(56) References Cited

U.S. PATENT DOCUMENTS

| | | | | |
|---|---|---|---|---|
| 4,964,077 A * | 10/1990 | Eisen | ...................... | G06F 9/453 715/707 |
| 8,930,357 B2 * | 1/2015 | White | ............... | G06F 17/30867 707/732 |
| 2002/0143898 A1 * | 10/2002 | Mansfield | .............. | G06Q 30/02 709/219 |
| 2009/0012833 A1 * | 1/2009 | Kuhlke | ............. | G06F 17/30539 705/7.14 |
| 2012/0197733 A1 * | 8/2012 | Skomoroch | ............ | G06Q 30/02 705/14.66 |
| 2013/0060756 A1 * | 3/2013 | White | ............... | G06F 17/30867 707/722 |
| 2013/0091001 A1 * | 4/2013 | Jia | ...................... | G06Q 30/0224 705/14.25 |
| 2013/0325779 A1 * | 12/2013 | Shahshahani | ............ | G06N 5/02 706/46 |
| 2015/0074001 A1 * | 3/2015 | Lee | ...................... | G06Q 10/101 705/300 |
| 2015/0186546 A1 * | 7/2015 | Rechterman | ...... | G06F 17/30905 715/234 |

OTHER PUBLICATIONS

NewsRx: "Web Page Customization Based on Expertise Level of a User" in Patent Application Approval Process Telecommunications Weekly [Atlanta] Jul. 22, 2015: 506; ProQuest Dialog #1696695349, 9pgs. (Year: 2015).*

* cited by examiner

*Primary Examiner* — Robert M Pond
(74) *Attorney, Agent, or Firm* — Kilpatrick Townsend & Stockton LLP

(57) ABSTRACT

Techniques described herein include a system and method for providing item descriptions customized to a skill level associated with a user. In some embodiments, statements related to an item may be stored and maintained by the service provider. Each statement may be associated with one or more skill levels. In some embodiments, statements associated with each skill level may be selected by members of a user community. Upon receiving a request for an item description, a service provider may determine a skill level associated with the requestor and may populate the item description with statements associated with the requestor's skill level.

20 Claims, 8 Drawing Sheets

CUSTOMIZED ITEM DESCRIPTIONS BASED ON SKILL LEVEL

BACKGROUND

An increasing number of business transactions are being conducted online each year. Online retailers can now offer almost any item that a consumer may desire. These online retailers often need to accommodate both sophisticated and unsophisticated consumers on the same website. This often presents challenges when providing a satisfying customer experience to customers of different levels of sophistication.

BRIEF DESCRIPTION OF THE DRAWINGS

Various embodiments in accordance with the present disclosure will be described with reference to the drawings, in which.

DETAILED DESCRIPTION

Figure 1:
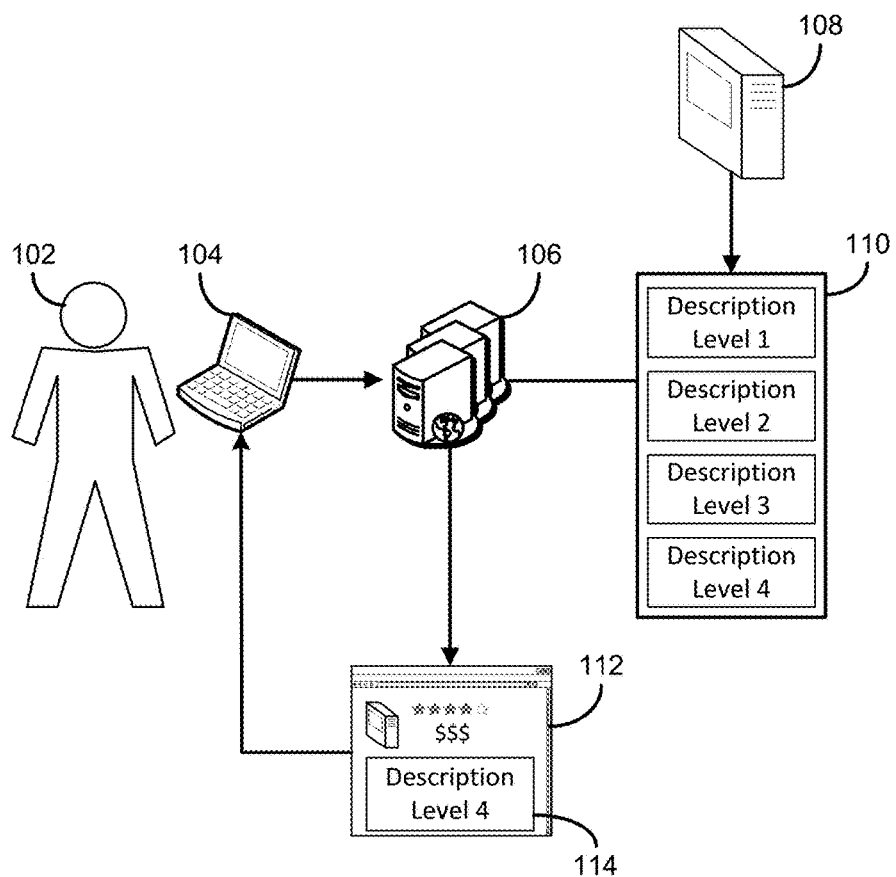
FIG. 1 depicts an illustrative user interaction with a skill-based item description population system in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a technique for customizing item descriptions based on detail/skill level. A service provider may maintain separate item descriptions, each associated with a particular detail/skill level. As used herein, a detail level is a level of detail that may be provided in an item description. For example, a description may be configured to contain more or less details depending on user preferences. A skill level refers to a relative amount of knowledge or experience that a consumer has with a particular item. When the consumer visits a network page associated with the item, the user may be provided with the item description correlated to the assessed skill level. In some embodiments, a user of a particular skill level may select or highlight helpful text from a user review for an item. The highlighted text may then be added to the item description associated with that skill level.

By way of illustrative example, consider the scenario in which a user wishes to purchase an item online. In this example, the user may visit an online website maintained by a provider of an electronic marketplace. The electronic marketplace provider may determine a skill level to associate with the user with respect to the item. The item webpage may then be loaded with an item description that reflects the determined skill level. In this way, the user is provided with the details that the user is likely to be interested in and in a format that is easier for the user to understand. In this example, the user may elect to be provided with a description that is associated with a higher or lower skill level.

By way of a second illustrative example, consider the scenario in which a user wishes to research an item by reading user provided reviews for the item. In this example, a user may be provided with a plurality of reviews for an item, each authored by another user. The user may be provided with the ability to select (e.g., via highlighting) a portion of text that is helpful to that user. A service provider may then determine that the selected portion of text is helpful to a user with the skill level of the user that selected it. In this example, the service provider may add the selected portion of text to the item description that is associated with the skill level of the current user.

In accordance with at least some embodiments, a user's skill level with a particular item or item category may be estimated based on a number of factors. For example, a service provider may analyze the user's purchase history, the user's online interaction data (e.g., clickstream data), the user's indicated preferences, or any other suitable information source to determine the skill level to associate with the user with respect to the item. For example, if the user has purchased several high-end cameras in the past, then the service provider may determine that the user is an expert in cameras. Alternatively, if the user has visited several chatrooms or forums, and has asked very basic questions about cameras, then the service provider may determine that the user is an amateur in cameras.

In accordance with at least some embodiments, an item may be associated with multiple item descriptions, each associated with a separate skill level. In accordance with at least some embodiments, different descriptions may each contain separate attributes. For example, one attribute may be important to an expert, but may only serve to confuse an amateur. In this example, the attribute may be included with a description associated with experts, but not included in a description associated with amateurs. In accordance with at least some embodiments, separate item descriptions may be populated by a user community. For example, users may be given the ability to vote on the best description for an item. In at least some embodiments, a user visiting a webpage associated with an item may be presented with the item description that is correlated to the user's skill level with respect to that item.

FIG. 1 depicts an illustrative user interaction with a skill-based item description population system in accordance with at least some embodiments. In FIG. 1, a user 102 is depicted as interacting with a client device 104, such as a laptop. In this illustrative embodiment, the client device may communicate with a service provider 106 (as indicated by the arrow between 104 and 106) to request webpage content related to one or more items 108. Service provider 106 may be any entity that maintains information about one or more items, such as an online retailer, a provider of a consumer reporting tool, a host of an item webpage, or any other suitable electronic catalog.

In accordance with at least some embodiments, requested item 108 may be associated with a plurality of item descriptions 110, that are each associated with a skill level. In at least some embodiments, the service provider 106 may estimate a skill level for user 102 with respect to the item 108. The service provider may then select the item description from the plurality of item descriptions 110 that corresponds to the determined skill level. An item description may comprise a description of the item, to include various attributes of the item or other item related information that is presented to a user. In some examples, an item description may be provided by a third party seller of the item or a manufacturer of the item. An item description may be in a text, audio, video, or any other suitable media format.

In accordance with at least some embodiments, the service provider may maintain or host a web page 112 related to item 108. When the webpage 112 is requested by client device 104, the service provider may generate webpage 112 populated with the item description that the service provider has selected for the user 102 (as indicated by the arrow between 106 and 112). The webpage 112 with populated item description 114 may then be served to client device 104 for presentation to user 102 (as indicated by the arrow between 112 and 104).

Figure 2:
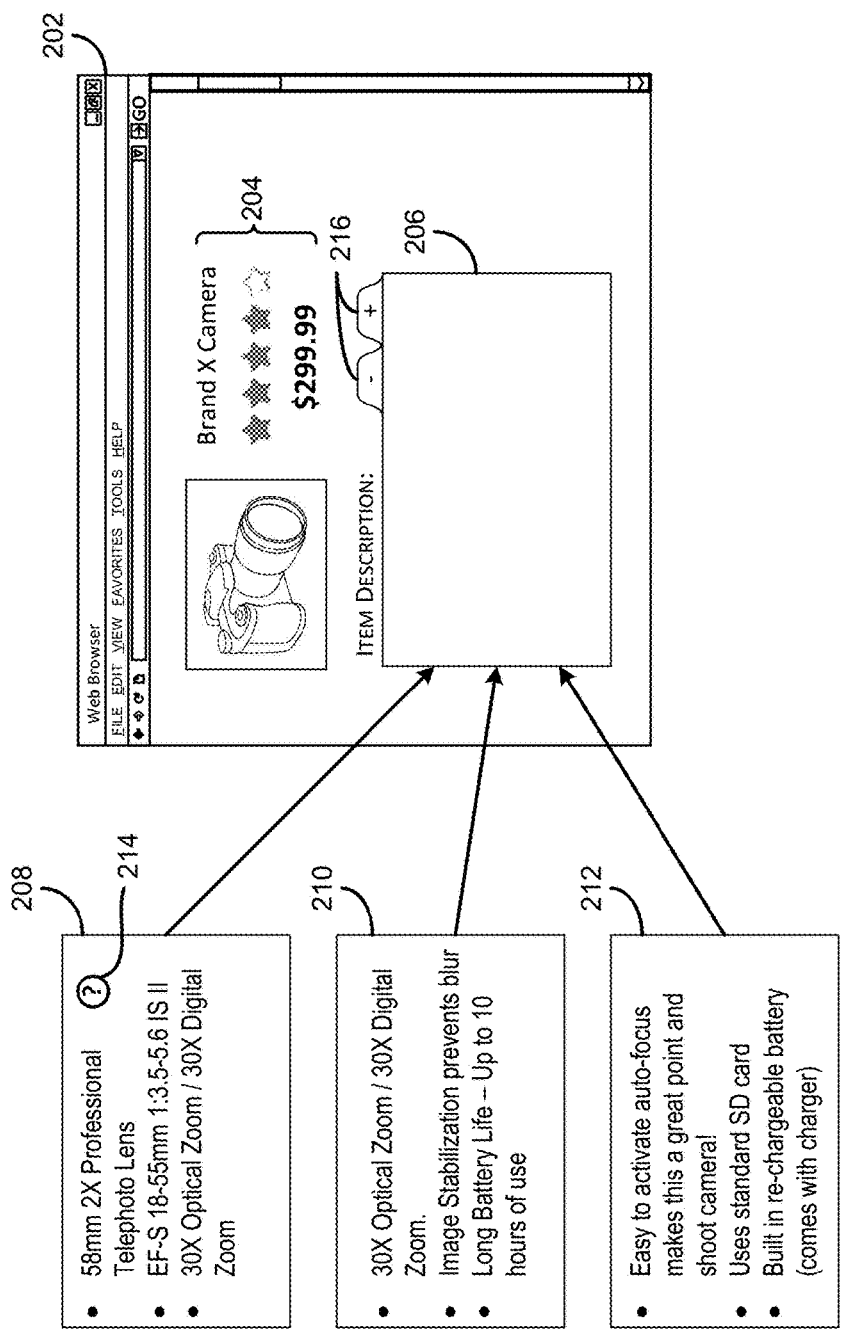
FIG. 2 depicts an illustrative example skill-based item description population system in accordance with at least some embodiments.

FIG. 2 depicts an illustrative example skill-based item description population system in accordance with at least some embodiments. In FIG. 2, a web browser 202 is depicted as accessing a webpage related to an item. In at least some embodiments, at least some item attributes 204 may be displayed on the webpage related to the item. For example, the name of the item, a digital image of the item, a user rating for the item, and/or a price for the item may be depicted. In some embodiments, the webpage may additionally be provided with a basic description of the item. In accordance with some embodiments of the disclosure, the webpage may include a descriptive text area 206 for displaying a description customized based on the user's skill level.

In accordance with at least some embodiments, the service provider may maintain multiple item descriptions 208, 210, and 212. In some embodiments, item descriptions 208, 210, and 212 may each be targeted at a particular skill level. For example, item description 208 may be directed to an expert or professional in a category related to the item. This may include any user that has extensive knowledge or experience with the item. In some embodiments, description 208 may include features that are commonly requested or searched for by users recognized as experts in the item category. Likewise, item description 210 may be associated with intermediate users. In some embodiments, the descriptive text included in item description 210 may include features commonly requested by intermediate users. Item description 212 may be associated with amateur users. In some embodiments, the descriptive text included in item description 212 may include features commonly requested by beginners or amateur users. In some embodiments, the description may provide additional details and/or may be more explicit. Additionally, one or more descriptive features may include a help button 214 that may be selected in order to provide an explanation of the feature. For example, upon selection of the help button 214, an attribute description may be provided for the feature. In some embodiments, the help button 214 may be used to expand the details of a particular feature, such that additional attributes or description is provided. In some embodiments, the help button may be configured to display multiple additional statements regardless of the skill level associated with the user and the item.

In accordance with at least some embodiments, the service provider may identify a skill level associated with the user that is viewing the webpage and, in response, may select the item description 208, 210, or 212 that is appropriate to that user. One or more of the descriptive features presented in the selected item description may be populated into descriptive text area 206. In at least some embodiments, the user may be given the ability to increase or decrease the skill level description displayed in descriptive text area 206. For example, increase and decrease indicators 216 may be provided for changing the skill level associated with the user and updating the item description accordingly. Some embodiments of the current disclosure may include a button, such as help button 214 that may be configured to increase or decrease the skill level associated with a particular feature. In this way, a user may elect a skill level for each individual attribute listed in an item description. In some embodiments, the user may also be given the ability to add statements regarding a particular feature to the item description. The user's manual selection of a skill level or added features may be saved with respect to a particular item category, such that the user is provided the requested information at the saved skill levels for each item that the user views in that item category.

In accordance with at least some embodiments, additional descriptive features may be added to descriptive text area 206 along with the item description. For example, if an amateur user performs a search on "camera zoom," then, in addition to selecting the item description 212 associated with camera amateurs, descriptive text area 206 may also include the zoom feature. In some embodiments, a user may select one or more features that should be presented when available. For example, a user may elect to be shown the maximum battery life of any item that he or she views. In this example, the battery life, when available, may be presented to the user regardless of whether it would normally be associated with his or her skill level. In some embodiments, this selection may be made via user settings or preferences.

Figure 3:
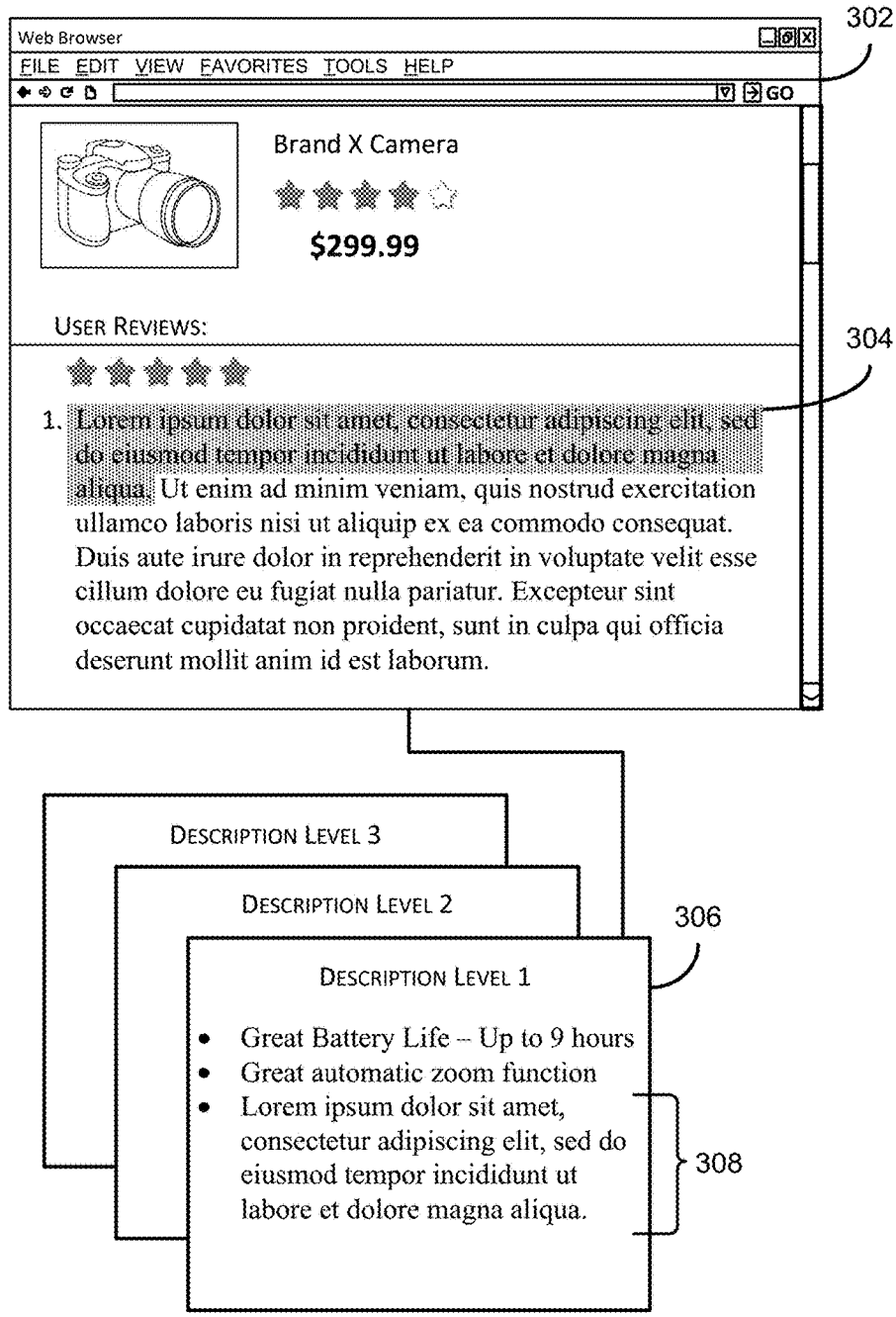
FIG. 3 depicts an item review selection technique in accordance with at least some embodiments.

FIG. 3 depicts an item review selection technique in accordance with at least some embodiments. In FIG. 3, a web browser 302 is depicted as accessing a webpage related to item reviews. In accordance with at least some embodiments, the webpage related to item reviews is a webpage that contains comments made by user of an online community related to the item. In at least some embodiments, a user may be given the ability to read each review and identify at least a portion of one or more reviews that are helpful or provide information desired by the user. In some embodiments, one or more users may submit an item description to be associated with a particular item. In accordance with at least some embodiments, a user or community of users may select a review, portion of a review, comment, or a submitted item description to be included in an item description. For example, the community of users may vote on reviews or portions of reviews that are helpful.

In at least some embodiments, the service provider may identify a skill level associated with one or more users that have provided review feedback. The service provider may then associate the identified comment 304 with an item description 306 that matches the skill level of the user that provided the review. For example, if a user who is determined to be an amateur in cameras identifies a portion of a camera review as being helpful, then the service provider may determine that the identified portion of the review may be helpful to other camera amateurs. In some embodiments, the identified comment may be appended to the item description text 308. In some embodiments, the identified comment may replace the current item description or be used to create a new item description.

In at least some embodiments, a service provider may reward users that submit reviews and/or potential item descriptions. In accordance with at least some embodiments, the service provider may allow users to accumulate points or other rewards for interacting with the community. In some embodiments, the service provider may keep track of user interactions with the community. For example, the service provider may keep track of the number of times that a user has successfully provided an item description or item review. Upon determining that the number is over a threshold, the service provider may determine that the user is a subject matter expert. For example, if the user has provided a significant number of reviews for laptops, then the user may be considered a laptop expert. In this scenario, if the user votes for item description language for another laptop, then his or her vote may be weighed more heavily than the vote of a user that is not an expert in laptops. In accordance with at least some embodiments, the service provider may provide experts with rewards. For example, if the service provider typically sends product samples to consumers in exchange for feedback, then the service provider may elect to send the samples to experts in the product being tested.

Figure 4:
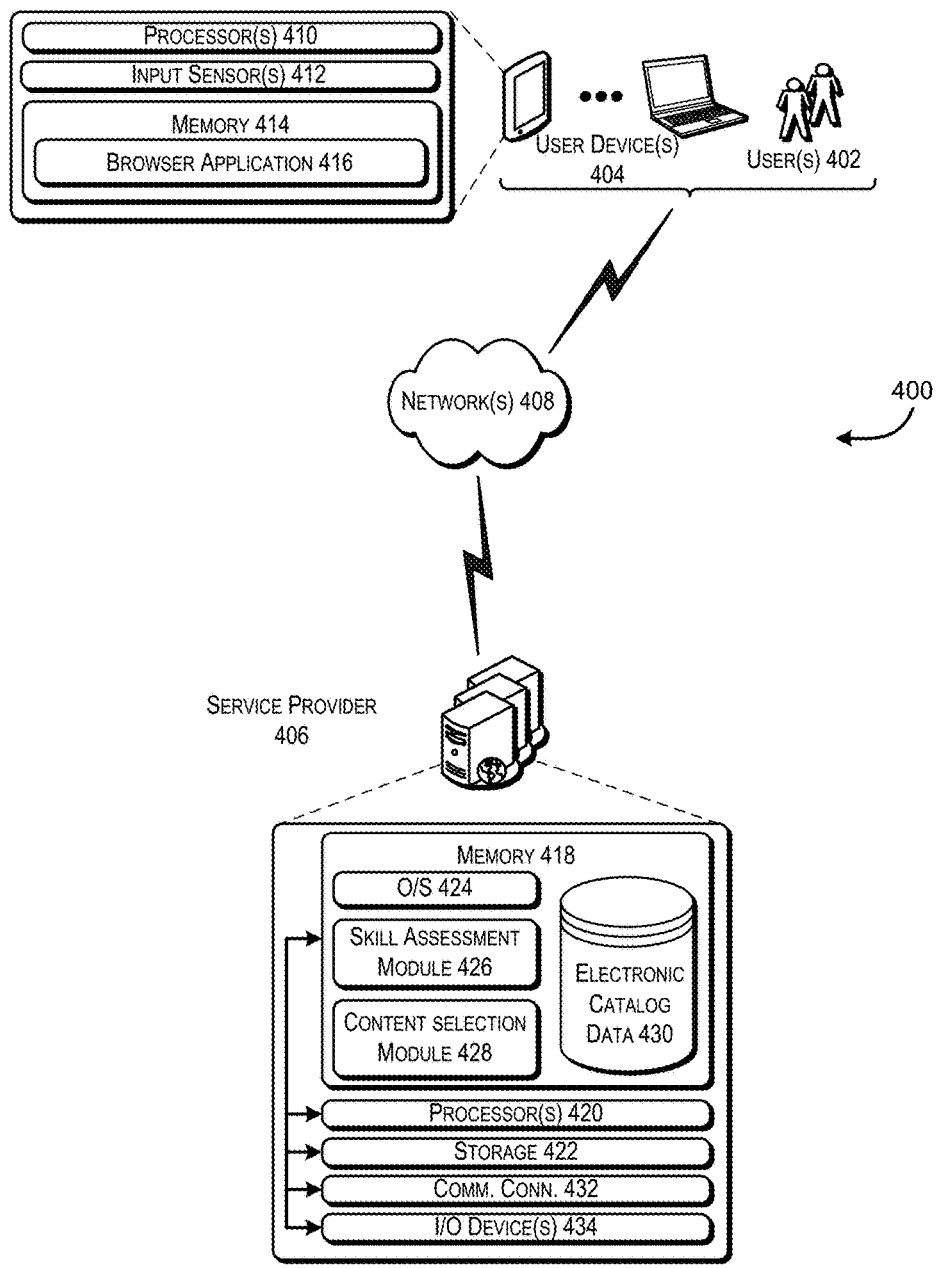
FIG. 4 depicts an illustrative example of a system architecture in which techniques for customizing item descriptions based on skill level may be implemented in accordance with at least some embodiments.

FIG. 4 depicts an illustrative example of a system or architecture 400 in which techniques for customizing item descriptions based on skill level may be implemented. In architecture 400, one or more consumers and/or users 402 may utilize user devices 404. In some examples, the user devices 404 may be in communication with a service provider 406 via the network(s) 408, or via other network connections.

The user devices 404 may be any type of computing device such as, but not limited to, a mobile phone, a smart phone, a personal digital assistant (PDA), a laptop computer, a desktop computer, a server computer, a thin-client device, a tablet PC, etc. Additionally, user devices 404 may be any type of wearable technology device, such as a watch, earpiece, glasses, etc. The user device 404 may include one or more processors 410 capable of processing user input. The user device 404 may also include one or more input sensors 412 for receiving user input. As is known in the art, there are a variety of input sensors 412 capable of detecting user input, such as accelerometers, cameras, microphones, etc. The user input obtained by the input sensors may be from a variety of data input types, including, but not limited to, audio data, visual data, or biometric data. Embodiments of the application on the user device 404 may be stored and executed from its memory 414. The memory 414 may include a browser application 416.

In some examples, the network(s) 408 may include any one or a combination of many different types of networks, such as cable networks, the Internet, wireless networks, cellular networks, and other private and/or public networks. While the illustrated example represents the users 402 accessing the service provider 406 via browser application 416 over the network(s) 408, the described techniques may equally apply in instances where the users 402 interact with a service provider 406 via the user device 404 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 416 may allow the users 402 to interact with a service provider 406, such as to store, access, and/or manage data, develop and/or deploy computer applications, and/or interact with web content. The one or more service providers 406, perhaps arranged in a cluster of servers or as a server farm, may be configured to host a website (or combination of websites) viewable via the user device 404 or a web browser accessible by a user device 404 via the browser application 416. Although depicted in memory of the user device 404 in this example, in some embodiments the browser application 416 may be hosted at a server. For example, the user device 404 may be a thin client device capable of accessing a browser application 416 remotely. The browser application 416 may be capable of handling requests from many users 402 and serving, in response, various user interfaces that can be rendered at the user device 404 such as, but not limited to, a web site. The browser application 416 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 416, such as with other applications running on the user device 404.

The service provider 406 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider 406 may be executed by one more virtual machines implemented in a hosted computing environment. The hosted computing environment may include one or more rapidly provisioned and released computing resources, which computing resources may include computing, networking, and/or storage devices. A hosted computing environment may also be referred to as a cloud-computing environment.

In one illustrative configuration, the service provider 406 may include at least one memory 418 and one or more processing units (or processor(s)) 420. The processor(s) 420 may be implemented as appropriate in hardware, computer-executable instructions, firmware, or combinations thereof. Computer-executable instruction or firmware implementations of the processor(s) 420 may include computer-executable or machine executable instructions written in any suitable programming language to perform the various functions described.

The memory 418 may store program instructions that are loadable and executable on the processor(s) 420, as well as data generated during the execution of these programs. Depending on the configuration and type of service provider 406, the memory 418 may be volatile (such as random access memory (RAM)) and/or non-volatile (such as read-only memory (ROM), flash memory, etc.). The service provider 406 may also include additional storage 422, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 418 may include multiple different types of memory, such as static random access memory (SRAM), dynamic random access memory (DRAM) or ROM. Turning to the contents of the memory 418 in more detail, the memory 418 may include an operating system 424 and one or more application programs or services for implementing the features disclosed herein including at least a module for assessing a user's skill level with an item category (skill assessment module 426) and a module for selecting content to include in an item description (content selection module 428). The memory 418 may also include electronic catalog data 430, which includes user data as well as data related to items in an electronic catalog. In some embodiments, the electronic catalog data 430 may be stored in a database.

The memory 418 and the additional storage 422, both removable and non-removable, are examples of computer-readable storage media. For example, computer-readable storage media may include volatile or non-volatile, removable or non-removable media implemented in any method or technology for storage of information such as computer-readable instructions, data structures, program modules, or other data. As used herein, modules may refer to programming modules executed by computing systems (e.g., processors) that are part of the user device 404 or the service provider 406. The service provider 406 may also contain communications connection(s) 432 that allow the service provider 406 to communicate with a stored database, another computing device or server, user terminals, and/or other devices on the network(s) 408. The service provider 406 may also include input/output (I/O) device(s) and/or ports 434, such as for enabling connection with a keyboard, a mouse, a pen, a voice input device, a touch input device, a display, speakers, a printer, etc.

Turning to the contents of the memory 418 in more detail, the memory 418 may include an operating system 424, a database containing electronic catalog data 430 and the one or more application programs or services for implementing the features disclosed herein, including a skill assessment module 426 and/or a content selection module 428.

In some embodiments, the skill assessment module 426 may be configured to determine a level of skill to associate with a user for an item or item category. In some embodiments, skill levels may be broken into categories such as amateur, beginner, average, highly skilled, or expert. In some embodiments, the skill level may be a number value. For example, a user may be classified as having a skill level from 1-100 in a particular category. The skill assessment module 426 may be configured to determine a user's skill level from the user's purchase history, the user's online interaction data (e.g., clickstream data), the user's indicated preferences, or any other suitable information source. In some embodiments, the skill assessment module 426 may identify one or more item categories from a user's purchase history. In some embodiments, particular purchase history items may be associated with skill levels for related items. For example, if a user has purchased an advanced camera lens in the past, then the skill assessment module 426 may determine that the user is an expert in cameras. In at least some embodiments, the skill assessment module 426 may utilize one or more clustering techniques to assign a user to a cluster of other users with similar attributes. Any suitable clustering technique may be utilized. Examples of suitable clustering techniques include connectivity-based clustering such as hierarchical clustering, centroid-based clustering such as k-means clustering, distribution-based clustering such as expectation maximization clustering, density-based clustering such as density-based spatial clustering of applications with noise (e.g., DBSCAN), subspace clustering, correlation clustering, and clustering based on genetic algorithms. In some embodiments, the user's interaction data (e.g., clickstream data) may be collected from server logs and/or a client device. In some embodiments, the skill assessment module 426 may be configured to determine a skill level based on the user interaction data.

In some embodiments, the content selection module 428 may be configured to identify comments and/or item descriptions relevant to a particular skill level and item. In accordance with at least some embodiments, a user community may vote for comments and/or item descriptions. In some embodiments, a user may highlight or otherwise indicate a selection of comments and/or item descriptions. In at least some embodiments, if the same comments and/or item descriptions are selected by multiple users, then the skill assessment module 428 may associate the selection with the item and one or more skill levels. In some embodiments, an item description may be compiled from a set of comments and/or item descriptions that are associated with the skill level and item. For example, if a user that is determined to be an amateur television consumer requests an item webpage for a television, then the webpage may be populated with each of the comments associated with the television and an amateur skill level.

Figure 5:
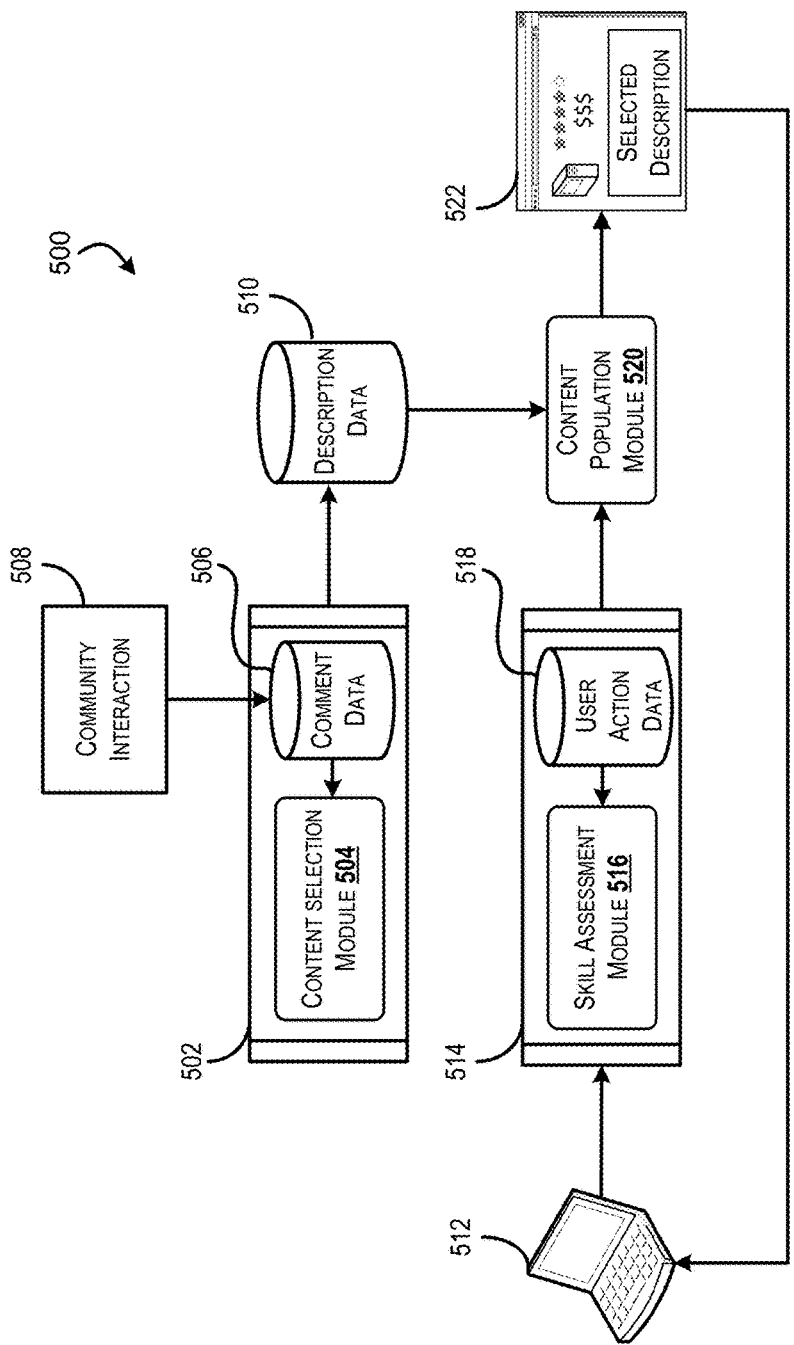
FIG. 5 depicts an example webpage content population technique in accordance with at least some embodiments.

FIG. 5 depicts an example webpage content population technique 500 in accordance with at least some embodiments. In accordance with at least some embodiments, a sub-process 502 may be implemented to extract item description data from various sources and compile one or more comments into an item description associated with a particular skill level. In at least some embodiments, a content selection module 504 may be configured to identify comments and/or item descriptions relevant to a particular skill level and item. Content selection module 504 may be an example content selection module 428 of FIG. 4. Content selection module 504 may analyze stored comment data 506 in order to identify one or more statements related to the item that would be appropriate to present to a user of a particular skill level. A statement may be a comment or any portion of a comment (e.g., a sentence fragment) related to an item.

In at least some embodiments, comment data 506 may be updated or edited via community interaction 508. For example, in accordance with at least some embodiments, community members may indicate that a statement about the item is helpful and/or accurate (e.g., via a vote). In this example, statements that receive at least a threshold number of indications may be added to an item description. In some embodiments, users may also be given the ability to flag duplicate or substantially similar statements for removal.

Once one or more statements related to the item that would be appropriate to present to a user of a particular skill level have been identified, the relevant statements may be stored in description data 510. In some embodiments, each statement may be associated with an item identifier for the item and a skill level. This allows the description to be generated dynamically by compiling the statements into a single item description. In some embodiments, statements may be stored as an item description in description data 510. Description data 510 may be updated periodically, or in real-time (as new information is received).

In accordance with at least some embodiments, a user may request a website related to an item via a client device 512. In accordance with at least some embodiments, client device 512 may be associated with one or more identifiers (e.g., an IP address). In accordance with at least some embodiments, the service provider may store an association between the client device 512 and the user. In some embodiments, the user may be required to log into an account with the service provider, allowing the service provider to associate the user with the submitted request for the item webpage.

Sub-process 514 may be configured to identify a skill level associated with the user making the request. Sub-process 514 may include a skill assessment module 516 that is configured to identify a skill level associated with the user for the item related to the item webpage. Skill assessment module 516 may be an example skill assessment module 426 of FIG. 4. In some embodiments, user action data 518 may be analyzed to determine a skill level associated with the user for a particular item. For example, the service provider may analyze log data to determine that the user has made extensive queries into a particular item. Based on these queries, the service provider may determine that the user is likely at least knowledgeable, or an intermediate user of the item. Alternatively, the service provider may determine that the user has asked very basic questions about the item and may conclude that the user is an amateur with respect to the item. In accordance with at least some embodiments, the service provider may compare the user to other users in order to determine a skill level to associate with the user. For example, the service provider may compare the user's purchase history or website browsing with other users. In this example, the service provider may attempt to ascertain a level of similarity between the user and one or more other users. Once a high level of similarity is found, the service provider may assign the skill level of the similar user to the user.

In accordance with at least some embodiments, a content population module 520 may be used to generate an item webpage 522. Once the service provider has determined the appropriate skill level associated with the user and the item webpage requested, the content population module may populate item webpage 522 with an item description from description data 510. In some embodiments, the content population module 520 may generate HTML or other markup language to include the appropriate item description. In some embodiments, the item description may be implemented as an item description webpage embedded within the item webpage 522. Once the item webpage has been generated, it may be provided to the client device 512.

Figure 6:
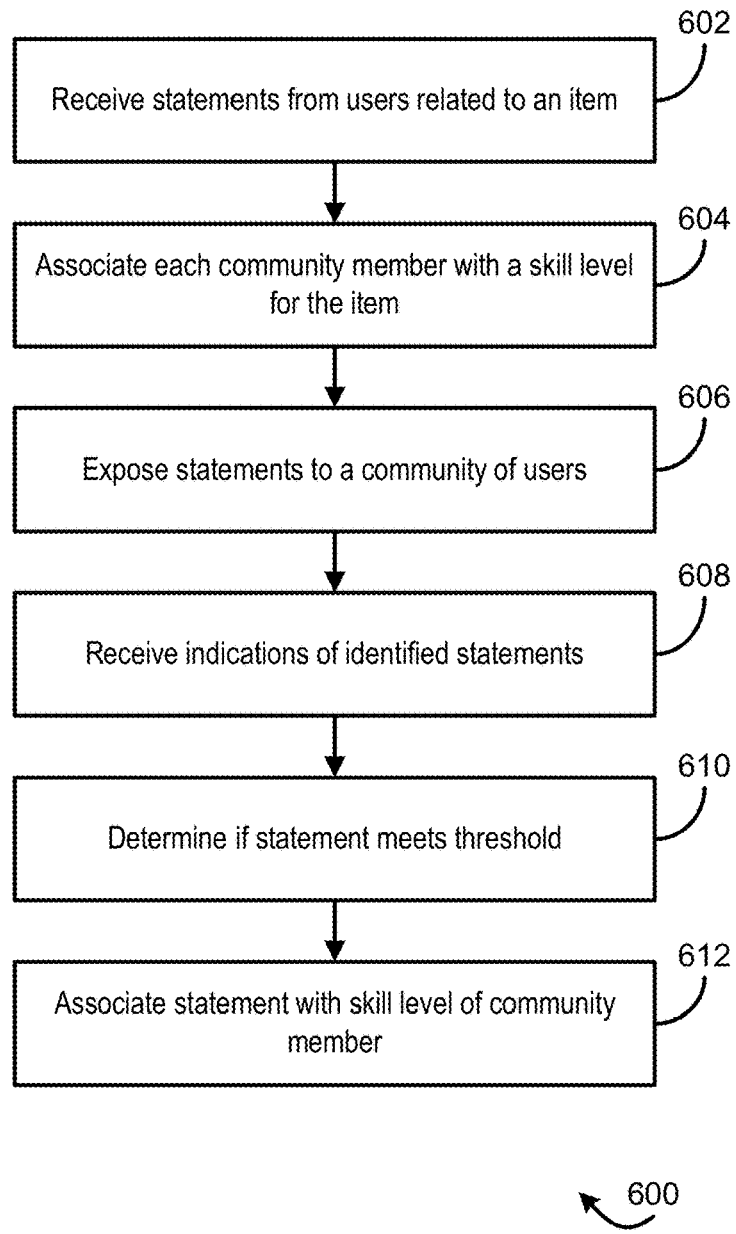
FIG. 6 depicts an illustrative flow diagram demonstrating an example technique for associating item statements with a skill level in accordance with at least some embodiments.

FIG. 6 depicts an illustrative flow diagram demonstrating an example technique for associating item statements with a skill level in accordance with at least some embodiments. The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by at least the one or more service providers 406 shown in FIG. 4. The code may be stored on a computer-readable storage medium, for example, in the form of a computer program including a plurality of instructions executable by one or more processors. The computer-readable storage medium may be non-transitory.

In accordance with at least some embodiments, process 600 may begin at 602 when one or more statements related to an item are received by users. For example, a user may provide a user review for an item. In some embodiments, the user may submit a potential item description for the item. In some embodiments, each user or member of the community may be associated with a skill level at 604. In some embodiments, the service provider may maintain a data store of skill levels for each item category for each member of the community. In some embodiments, upon receiving a request to view user reviews for an item, the service provider may determine a skill level for the community member that requested to view the item webpage. In this way, interactions between a community member and one or more item reviews may be associated with the determined skill level. The service provider may expose the received statements to a community of users at 606. For example, one or more item reviews provided by various users may be available for viewing by members of the community. In at least some embodiments, a user may be given the ability to select (e.g., via highlighting or any other suitable means of providing an indication) at least a portion of the statement at 608. In some embodiments, the service provider may also store an indication of the skill level of the user that provided the selection.

In accordance with at least some embodiments, upon receiving one or more indications of statements (or portions thereof), the service provider may determine if a threshold number of indications has been reached at 610. If the threshold number of indications has been reached for at least one skill level, then the service provider may determine that the statement should be added to the item description associated with the skill levels for which the threshold number has been reached at 612. For example, consider the scenario in which 50 users believe that a statement from an item review is helpful and highlight it. In this scenario, 35 may be amateurs, 10 may be intermediate users, and 5 may be experts. If the threshold number in this example is 20, then the statement may be added to the item description associated with amateurs. However, if the threshold number in this example is 10, then the statement may be added to the item descriptions associated with both amateurs and intermediate users.

Figure 7:
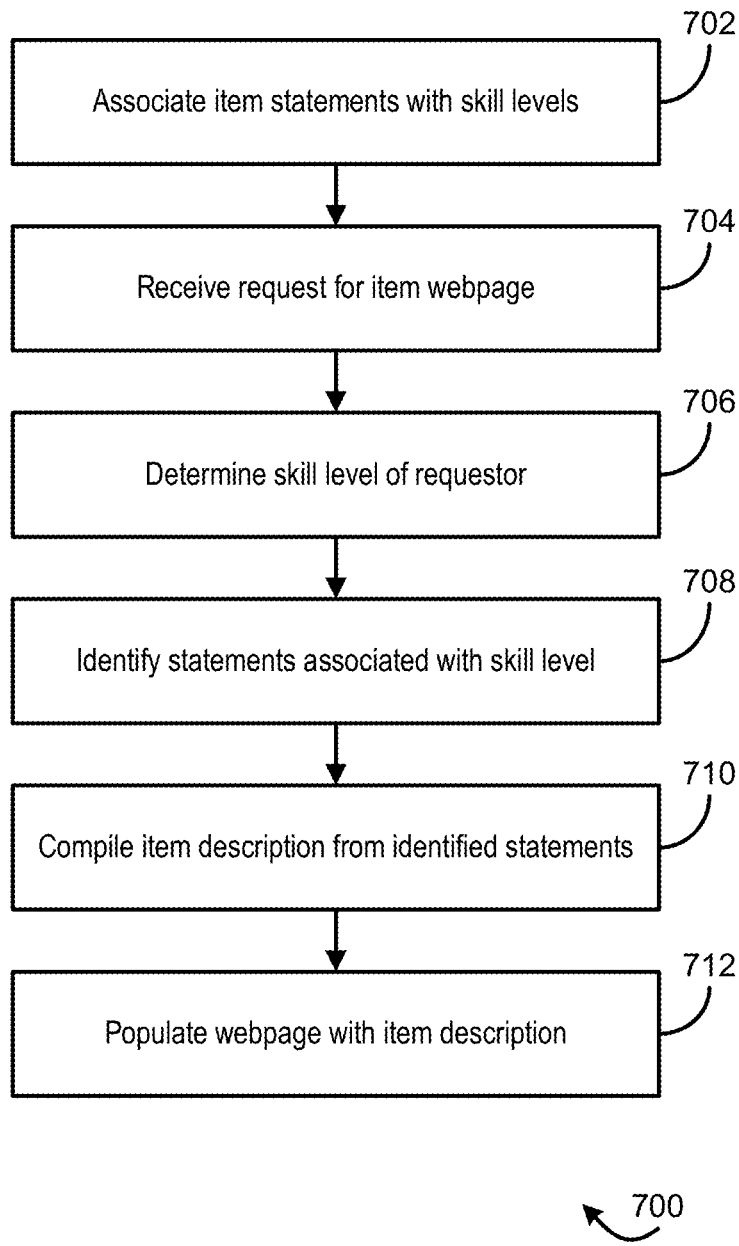
FIG. 7 depicts an illustrative flow diagram demonstrating an example technique for populating an item description based on a skill level in accordance with at least some embodiments.

FIG. 7 depicts an illustrative flow diagram demonstrating an example technique for populating an item description based on a skill level in accordance with at least some embodiments. The process 700 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types.

The order in which the operations are described is not intended to be construed as a limitation, and any number of the described operations can be omitted or combined in any order and/or in parallel to implement this process and any other processes described herein.

In accordance with at least some embodiments, process 700 may begin at 702 when one or more statements related to an item are associated with various skill levels. In some embodiments, the service provider may store item descriptions associated with both the item and one or more skill levels. In some embodiments, the service provider may store separate statements, each of which is associated with the item and one or more skill levels that may be compiled into an item description upon receiving a request.

The service provider may receive a request for an item webpage at 704. In response to receiving the request, the service provider may determine a skill level to be associated with the requestor at 706. In some embodiments, the service provider may do this by identifying a skill level associated with users that are similarly situated to the requestor. For example, the service provider may use one or more clustering techniques to form clusters or groups of users. In this example, the clustering technique may be used to place the requestor into the group of users most similar to him or her. The service provider may then identify the most prevalent skill level for a particular item or item category shared by the cluster and assign it to the requestor. Other techniques for determining a skill level for the user are described elsewhere in this disclosure.

Once a skill level has been determined for the requestor, the service provider may identify statements associated with that skill level and the requested item at 708. The identified statements may then be compiled into an item description at 710. For example, if the service provider has determined that the requestor is an amateur in cameras, and the requestor has requested a webpage related to a Brand X Camera, then statements associated with amateur users of the Brand X Camera may be queried and compiled into a single item description. Once an item description has been compiled, the item webpage may be populated with the item description at 712.

Figure 8:
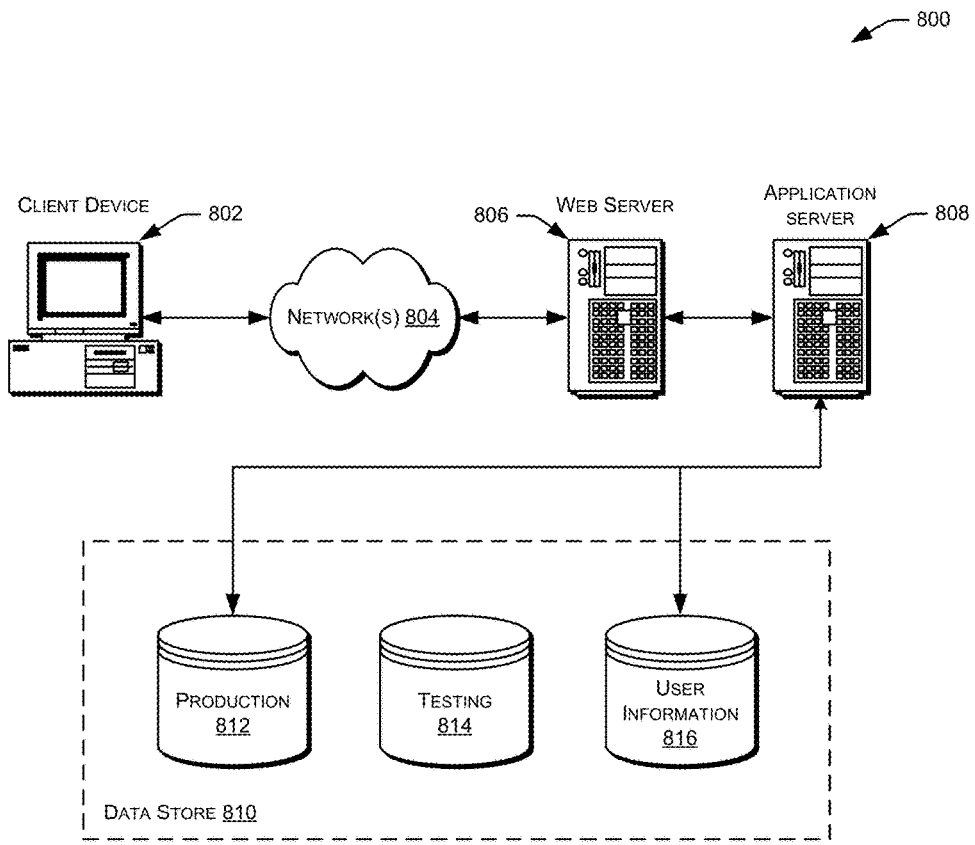
FIG. 8 illustrates an environment in which various embodiments can be implemented.

FIG. 8 illustrates aspects of an example environment 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. However, it will be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   maintaining, at a service provider, a set of item descriptions associated with an item, the set of item descriptions associated with a set of skill levels, each item description in the set of item descriptions associated with a particular skill level of the set of skill levels and having been generated based on feedback received from users of that particular skill level;
   receiving, from a user, a request to view a network document related to the item;
   determining a skill level from the set of skill levels associated with the user with respect to a category associated with the item by:
      identifying a category associated with the item;
      identifying an account associated with the user;
      determining, based on information stored in the account, a number of historical actions that the user has performed with respect to items within the category; and
      upon determining the number of historical actions has exceeded a threshold associated with the skill level, assigning the skill level corresponding to the user's experience with the category associated with the item to the user;
   identifying a corresponding item description from the set of item descriptions based at least in part on the determined skill level;
   generating the network document related to the item to include one or more attributes associated with the item as well as the identified item description; and
   providing the network document for presentation to the user.

2. The computer-implemented method of claim 1, further comprising upon receiving an indication from the user, providing the user with a second item description corresponding to a different skill level of the set of skill levels.

3. The computer-implemented method of claim 1, wherein the item description is provided in a description field of the network document.

4. The computer-implemented method of claim 1, further comprising identifying features of user interaction data associated with the user, wherein the skill level is determined based at least in part on the identified features corresponding to features of user interaction data associated with users of a known skill level.

5. The computer-implemented method of claim 4, wherein the user interaction data comprises clickstream data.

6. A system comprising:
   a processor; and
   a memory including instructions that, when executed with the processor, cause the system to, at least:
      receive, from a user, a request related to an item;
      determine a skill level associated with the user by:
         identifying a category associated with the item;
         identifying an account associated with the user; and
         determining, based on a number of historical actions that the user has performed with respect to items within the category, the skill level for the user;
      identify a detail level associated with the skill level, the detail level associated with the skill level by virtue of being identified by other users associated with the skill level;
      determine one or more statements based on the detail level to be presented with respect to the item;
      generate an item description to include the one or more statements; and
      provide the generated item description in a response to the request to the user.

7. The system of claim 6, wherein the request comprises a request for a network document related to the item.

8. The system of claim 7, wherein the generated item description is embedded in the network document.

9. The system of claim 6, wherein the detail level is determined based at least in part on user preferences.

10. The system of claim 6, wherein the detail level is determined based at least in part on a purchase history associated with the user.

11. The system of claim 6, wherein the one or more statements are identified from user reviews for the item.

12. The system of claim 6, wherein the one or more statements are generated, at least in part, by a community of users.

13. The system of claim 12, wherein the one or more statements are identified by one or more members of the community via voting.

14. The system of claim 13, wherein each statement of the one or more statements is associated with a second skill level assigned to the one or more members of the community that voted for the statement.

15. A non-transitory computer readable medium storing specific computer-executable instructions that, when executed with a processor, cause a computer system to at least:
- assign one or more statements related to an item to one or more skill levels;
- receive, from a user, a request related to the item;
- determine a skill level associated with the user by:
  - identifying a category associated with the item;
  - identifying an account associated with the user; and
  - determining, based on a number of historical actions that the user has performed with respect to items within the category, the skill level for the user;
- identify, from the one or more statements related to the item, a set of statements assigned to the skill level, the set of statements assigned to the skill level based upon identification of the statements by other users associated with the skill level;
- generate a network document to include at least the set of statements; and
- provide the network document to the user in response to the request.

16. The computer readable medium of claim 15, wherein the skill level associated with the user is determined based at least in part on comparing the user to similarly situated users.

17. The computer readable medium of claim 16, wherein the skill level associated with the user is determined by utilizing one or more clustering techniques.

18. The computer readable medium of claim 15, wherein at least one statement of the set of statements is assigned to multiple skill levels of the one or more skill levels.

19. The computer readable medium of claim 15, wherein the one or more statements related to the item are extracted from one or more item reviews.

20. The computer readable medium of claim 19, wherein the one or more statements related to an item are selected by one or more users via highlighting at least a portion of the one or more item reviews.

* * * * *